United States Patent

[11] 3,626,417

[72] Inventor Everett A. Gilbert
P.O. Box 1206, Montrose, Colo. 81401

[21] Appl. No. 805,294
[22] Filed Mar. 7, 1969
[45] Patented Dec. 7, 1971

[54] HYBRID FREQUENCY SHIFT-AMPLITUDE MODULATED TONE SYSTEM
2 Claims, 4 Drawing Figs.

[52] U.S. Cl. 343/203, 178/66, 179/15, 325/26, 325/30, 332/17
[51] Int. Cl. H04j 5/00, H04b 1/00
[50] Field of Search 178/66; 325/30, 163, 26, 307, 320; 179/2 DP, 15 BY, 15 BM; 332/17; 343/200–203

[56] References Cited

UNITED STATES PATENTS

| | | | |
|---|---|---|---|
| 2,378,298 | 6/1945 | Hilferty | 325/30 |
| 3,011,023 | 11/1961 | Billig et al. | 325/30 |
| 3,136,949 | 6/1964 | Firestone | 325/30 |
| 3,302,114 | 1/1967 | Hertog | 178/66 |
| 3,486,117 | 12/1969 | Groves et al. | 325/163 |

*Primary Examiner*—Robert L. Griffin
*Assistant Examiner*—Albert J. Mayer

ABSTRACT: A two channel data transmission system using amplitude modulation of the frequency shifted carrier of one channel to transmit the data of the second channel. Both channels operate at the maximum data rate at which either a single AM or FS channel would operate over the same band width.

INVENTOR
Everett A. Gilbert

INVENTOR
Everett A. Gilbert

INVENTOR Everett A. Gilbert

INVENTOR
Everett A. Wilbert

HYBRID FREQUENCY SHIFT-AMPLITUDE MODULATED TONE SYSTEM

This invention relates to frequency division multiplex circuits used for data and voice transmission over telephone lines, radio, microwave and like means of communication.

The invention will be described below with respect to nonsynchronous frequency division tone channels, in which the voice band is divided up into several narrow band channels by electric filters and signaling tones are transmitted through each narrow band channel. It is understood that the apparatus is not limited to this particular application, but can operate over a communication channel of any bandwidth and carry two channels of information in the frequency spectrum occupied by a common amplitude modulated signal. Also the phrase "data Transmission" as used in the following description is understood to include all meaningful intelligence including voice.

In the past, the signaling tones were amplitude modulated, usually by turning them full on or entirely off, or frequency modulated by shifting the carrier frequency by 20 percent or less. This invention modulates the tone signals both in amplitude and in frequency and conditions it for transmission. After transmission through a modern communication system such as wire lines, radio, microwave or other facilities which have little effect on the hybrid signal, the invention receives and conditions the signal and applies the signal to two demodulator circuits. One circuit senses the frequency shift of the signal and is insensitive to amplitude modulation. The other circuit detects the amplitude of the envelope of the signal and is insensitive to the frequency shift modulation.

Two channels of data are applied to the input of the transmitter section and two reproduced signals are available at the receiver output. The frequency spectrum and required bandwidth for transmission of the hybrid signal at the output of the transmitter is identical to that of an amplitude modulated wave, which is the same bandwidth required for a frequency shift modulated signal for an index of modulation less than 1.0. Thus the number of channels of information transmitted through a system using my invention is twice that of present systems, which results in large cost savings to the user.

It is well known that when an amplitude modulated signal is transmitted through a linear network consisting of resistors, inductors, and capacitors, that a frequency shift of the carrier can result, and also that when a frequency modulated carrier signal is transmitted through an R—L—C network that amplitude modulation is observed on the carrier. It is also true that a signal which is both amplitude and frequency modulated will be changed in passing through an R—L—C network so that crosstalk between the demodulated signals occurs. In the past, this feature of hybrid modulation has limited the use of the technique. Also, past attempts to use this form of modulation have failed because changes in line signal levels adversely affected the amplitude modulated channel. As will become apparent in the description of my invention, these difficulties have been eliminated or minimized to create a reliable data transmission system.

An object of this invention is the provision of a dual channel data transmission system using the frequency spectrum of a single channel data transmission system, the dual channels of my invention each operating at the same maximum data rate as the single channel.

An object of this invention is to generate a double-modulated electrical signal from two data channels, prepare it for transmission on a common communication circuit, prepare the received signal for demodulation, demodulate the carrier signals into two channels with the crosstalk ratio between channels greater than 15db.

An object of this invention is to minimize the effect of the variation of average signal levels on a telephone line upon the demodulation of hybrid amplitude-frequency modulated signals.

These and other objects and advantages will become apparent from the following description when taken with the accompanying drawings which illustrate one embodiment of the invention, it being understood that the description is not to be construed as restricting the scope of the invention beyond the terms of the claims appended hereto.

In the drawings wherein like reference characters identify like parts in the two views.

Figure 1:
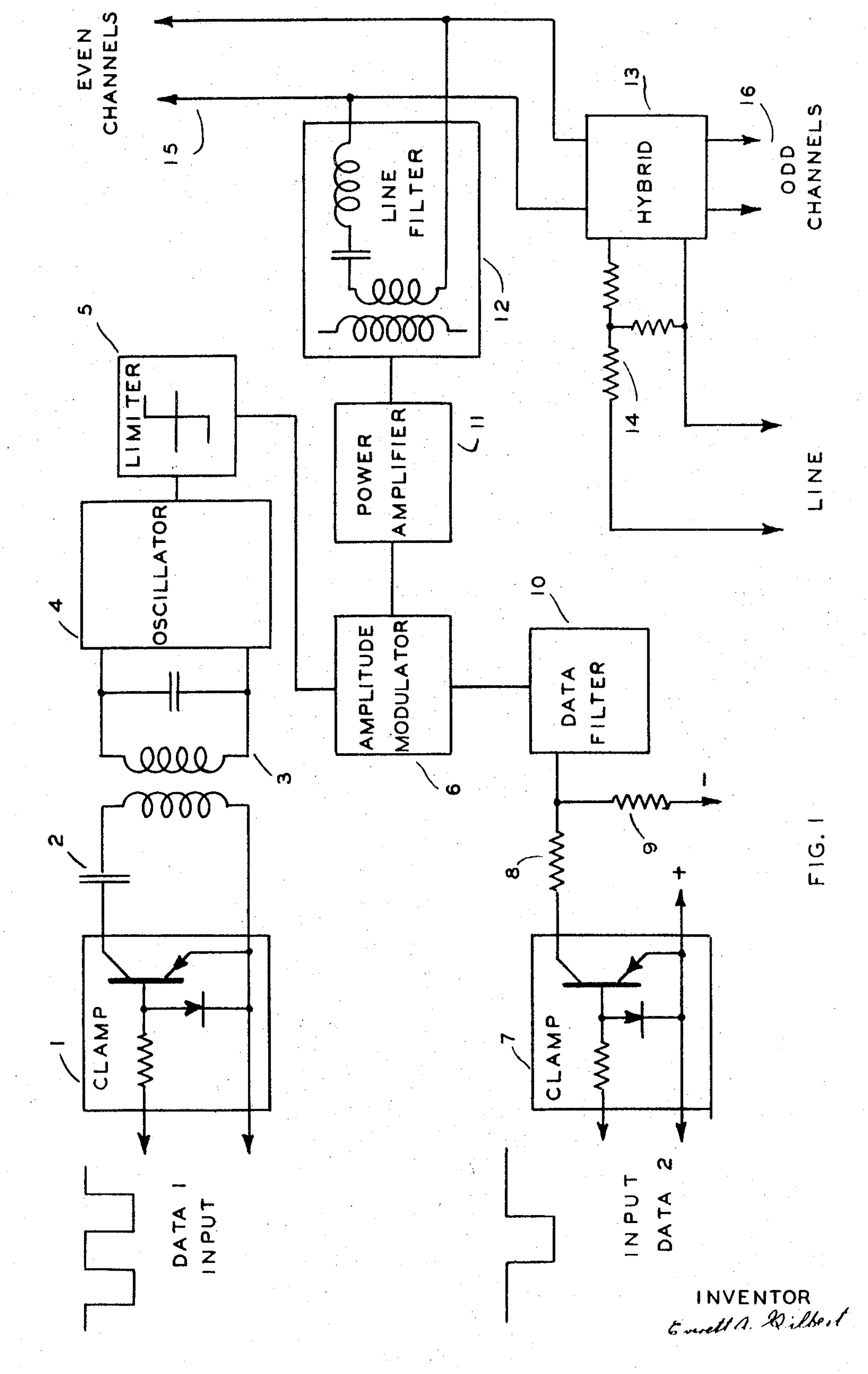
FIG. 1 is a system diagram of the transmitting section which generates a hybrid carrier signal, of which the frequency is modulated by one data channel and the amplitude is modulated by the second data channel and which prepares this hybrid carrier signal for transmission on a telephone line or other common transmission circuit.

Referring now to FIG. 1, two data signals bearing different information at different and nonsynchronous rates are connected to the invention and are represented by adjacent waveforms. The first data channel potential drives input clamp 1 which by my choice in this embodiment is a silicon PNP transistor, although it could be a relay or other switching device. When a negative current is applied to the base of this transistor, the collector conducts and clamps capacitor 2 across a winding of oscillator coil 3. When no current is applied to the base of the transistor, the collector rectifies on reverse half cycles and a DC potential builds up across capacitor 2, biasing the transistor in the forward direction, but no significant collector current flows, leaving the circuit effectively open for AC current flow through capacitor 2. Shorting capacitor 2 across a winding of the tuned oscillator coil 3 as described above lowers the frequency of oscillation of the circuit. The frequency of oscillation with clamp open, defined as the "space" frequency, is usually set at least ten times the maximum data rate, and the frequency with the clamp closed, defined as the "mark" frequency, is normally in the range of 0.8 to 0.98 times the space frequency. The frequency shift oscillator circuit 4 by designer's choice may be any regenerative network with a fixed output driving impedance to the tuned coil 3. In this embodiment the circuit was a transistor multivibrator circuit with the tuned circuit connected between collectors. Abrupt changes in frequency of oscillation due to the sharp switching action of input clamp 1 are prevented by setting the L—C ratio and Q of tuned coil 3 with regard to the oscillator output driving impedance so that the factor $1/Q$ is two to four times the maximum data dot cycle rate. This invention uses the Q of the oscillator tuned circuit and driving impedance to restrict the frequency spectrum used by the frequency shift modulation components of the output hybrid signal.

The switching of capacitor 2 across the winding of tuned coil 3 absorbs energy from the tuned circuit and creates amplitude modulation of the oscillator output. Limiter circuit 5 clips the oscillator output and removes the amplitude modulation from it before being applied to the amplitude modulator circuit 6.

Returning now to the data channel 2 input, a transistor clamping circuit 7, similar to that used to modulate the frequency shift oscillator, is used to switch current through a voltage divider made up of resistors 8 and 9. When the switching transistor is open, the negative source voltage is applied to the amplitude data filter 10. When the switching transistor's collector is conducting, a small negative voltage is applied to the amplitude data filter. The ratio between the maximum and minimum negative potential present at the junction of resistors 8 and 9 is 10db. in this embodiment of my invention. This ratio yields an amplitude modulation factor near 0.50. Other ratios may be used provided the carrier is not cut off during any portion of the modulation cycle. This simple embodiment provides both accurate limiting, bias, and ratio control over the data signal applied to the amplitude data filter.

The low-pass amplitude data filter 10 prevents fast amplitude changes of the amplitude modulator 6 output due to the switching of the clamp circuit 7. It can be shown that fast amplitude changes in the hybrid carrier results in a frequency modulation component in the carrier after transmission through a linear network. This becomes crosstalk between the data channels upon demodulation in the receiver section. In this embodiment the filter consists of a resistor capacitor network that is set to charge to 95 percent of final potential in one baud.

The output of the amplitude modulator 6 is a frequency modulated carrier with amplitude being additionally modulated by the data channel 2 information. This output is amplified by the power amplifier 11 to drive the transmit filter 12. This filter serves two purposes, one, to match the power amplifier to a line without loading adjacent channels of the same design and, two, to restrict the frequency spectrum of the hybrid signal to a prescribed band. This filter is critical in that it must not delay or change the amplitude ratios between the components of the hybrid signal or the frequency of those components. In my embodiment, carefully designed and constructed linear phase band pass filters were employed. A hybrid matching network 13 is used to preserve the filter characteristics when channels are closely spaced on the line. Odd channels 16 are connected to one side of the hybrid and even channels 15 to the other side. An attenuator 14 is placed in the output to improve the match to the telephone line.

The output of the balanced hybrid network is connected to a telephone line or other common communication system. When the bandwidth of the line is several times the bandwidth of an individual channel, the delay and frequency disturbance to the hybrid signal is insignificant.

Figure 2:
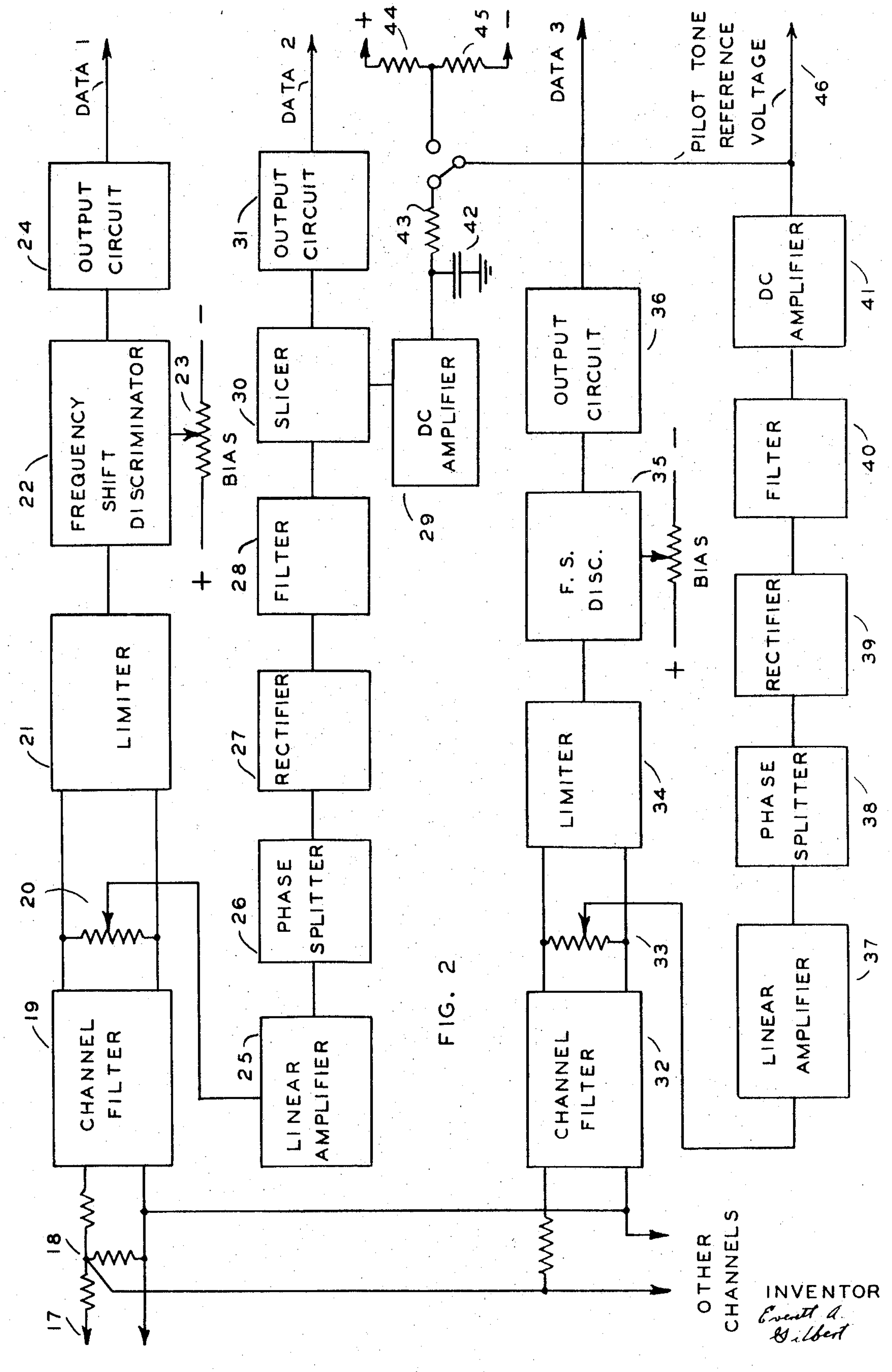
FIG. 2 is a system diagram of the receiving and demodulation section of the invention.

FIG. 2 shows the terminating end of the line 17 and the receiving section. As in the transmitting section, the channel filters 19 and 32 are designed to have good envelope delay and amplitude characteristics. These characteristics are preserved by the resistive pad 18 that isolates the filters from each other. The output of channels filter 19 serves as common terminals for the frequency shift and amplitude envelope demodulation circuits.

Considering the frequency shift demodulation circuits first, the hybrid signal is connected to a commercial microcircuit limiting amplifier that has a 4 volt square wave output for inputs above —40dbm. and thus removes the amplitude modulation from the carrier envelope. The limited output retains the frequency shift modulation. This signal is then applied to the frequency shift discriminator circuit 22 which has a positive polarity output for a mark signal and a negative polarity space signal in my embodiment. A bias potential is inserted in the network by potentiometer 23 to properly set the data signal bias at the input of the output circuit 24. The data channel 1 information is then taken from this circuit.

Returning to the common terminals at the output of the channel filter 19, potentiometer 20 is used to adjust the hybrid signal level at the input to the microcircuit linear amplifier 25 of approximately 40db. gain. In my embodiment the output of the linear amplifier 25 is connected to a phase splitter circuit 26 and transistor class C rectifier circuit 27 to save space and cost, but the function of the circuits could be performed equally well by a transformer and diodes in a full wave connection. The carrier frequencies are filtered from the output of the rectifier by the low pass filter 28. The slicer voltage comparator 30 compares the reference output of DC amplifier 29 with the data signal from the low-pass filter 28. If the data voltage at filter 28 output exceeds the DC amplifier 29 output, one of the binary conditions exists at the output circuit 31; if the data voltage is less, the other binary condition exists. The input to the DC amplifier 29 is taken through a large time constant consisting of resistor 43 and capacitor 42 from either a fixed reference voltage supplied by voltage divider resistors 44 and 45 or from a variable source dependent upon the average value of a pilot tone transmitted through the telephone line. The fixed reference voltage is used when the line levels on the telephone line are stable or well regulated. The pilot tone reference is used when telephone line levels vary. When the line levels vary, the pilot tone reference tracks the average data voltage excursions and maintains the telegraph bias setting of the data channel 2 signal in the output circuit 31. The pilot tone reference is obtained from a adjacent channel used for frequency modulated signals only, with the circuitry of the receiving section arranged as shown in the lower part of FIG. 2. Here the band-pass channel filter 32 separates the frequency modulated signal from the line. Data channel 3 is only frequency modulated at the transmit end and is demodulated by limiting amplifier 34, discriminator 35, and output circuit 36. The amplitude demodulator circuitry provides the DC pilot tone reference voltage. Potentiometer 33 sets the input level to linear amplifier 37. Phase splitter 38, rectifier 39, and filter 40 supply a DC input to DC amplifier 41 proportional to the average signal level of the frequency modulated tone at the output of channel filter 32. The change of this level due to transmission over the telephone will usually be proportional to the change of level of all the other tone channels carried by the telephone line. The output of DC amplifier 41 then can be used as a pilot tone reference voltage 46 for all the other amplitude demodulators with signals being transmitted by the same line.

Figure 3:
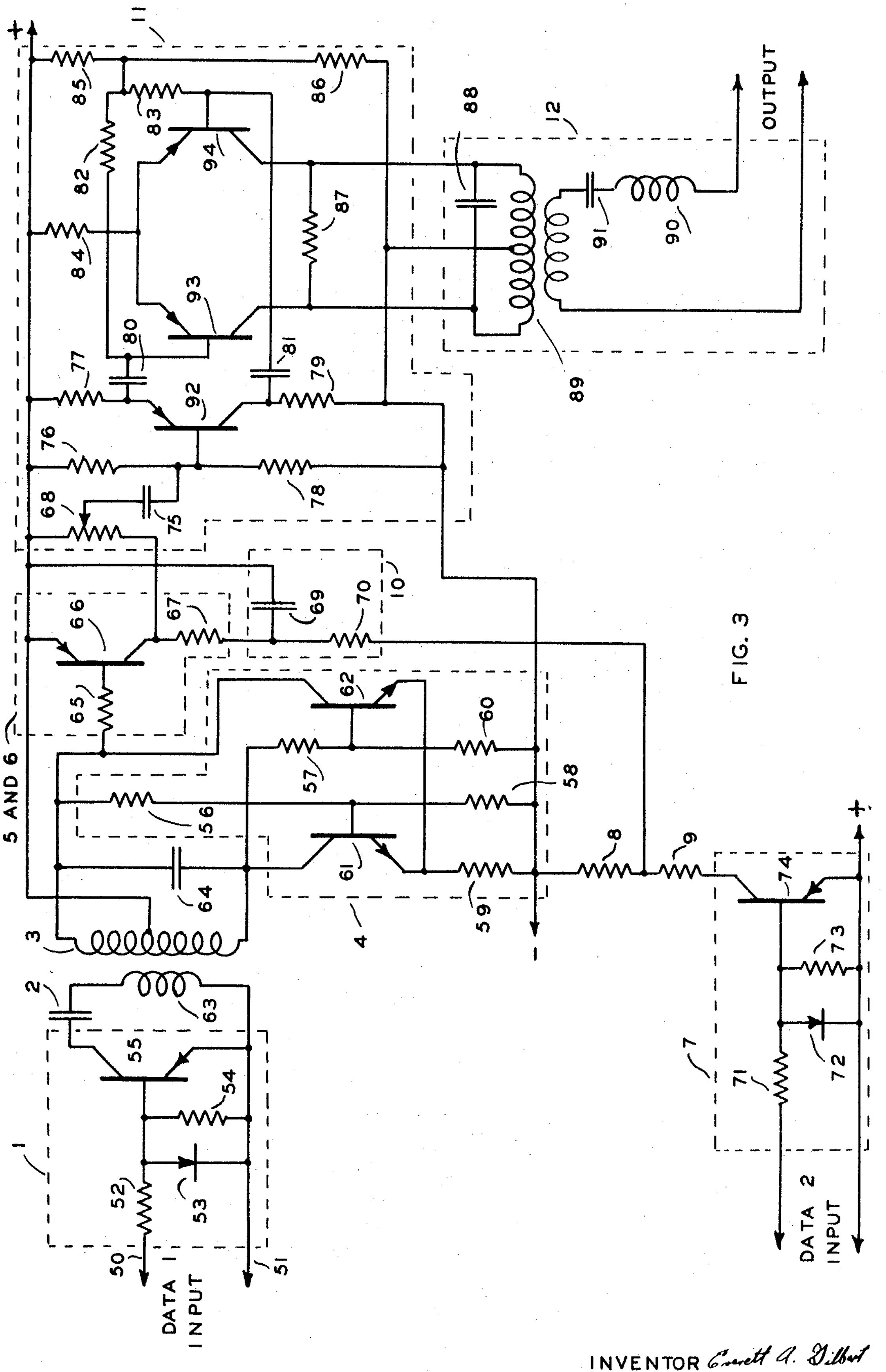
FIG. 3 is a schematic diagram showing one embodiment of the transmitting section of my invention.
Figure 4:
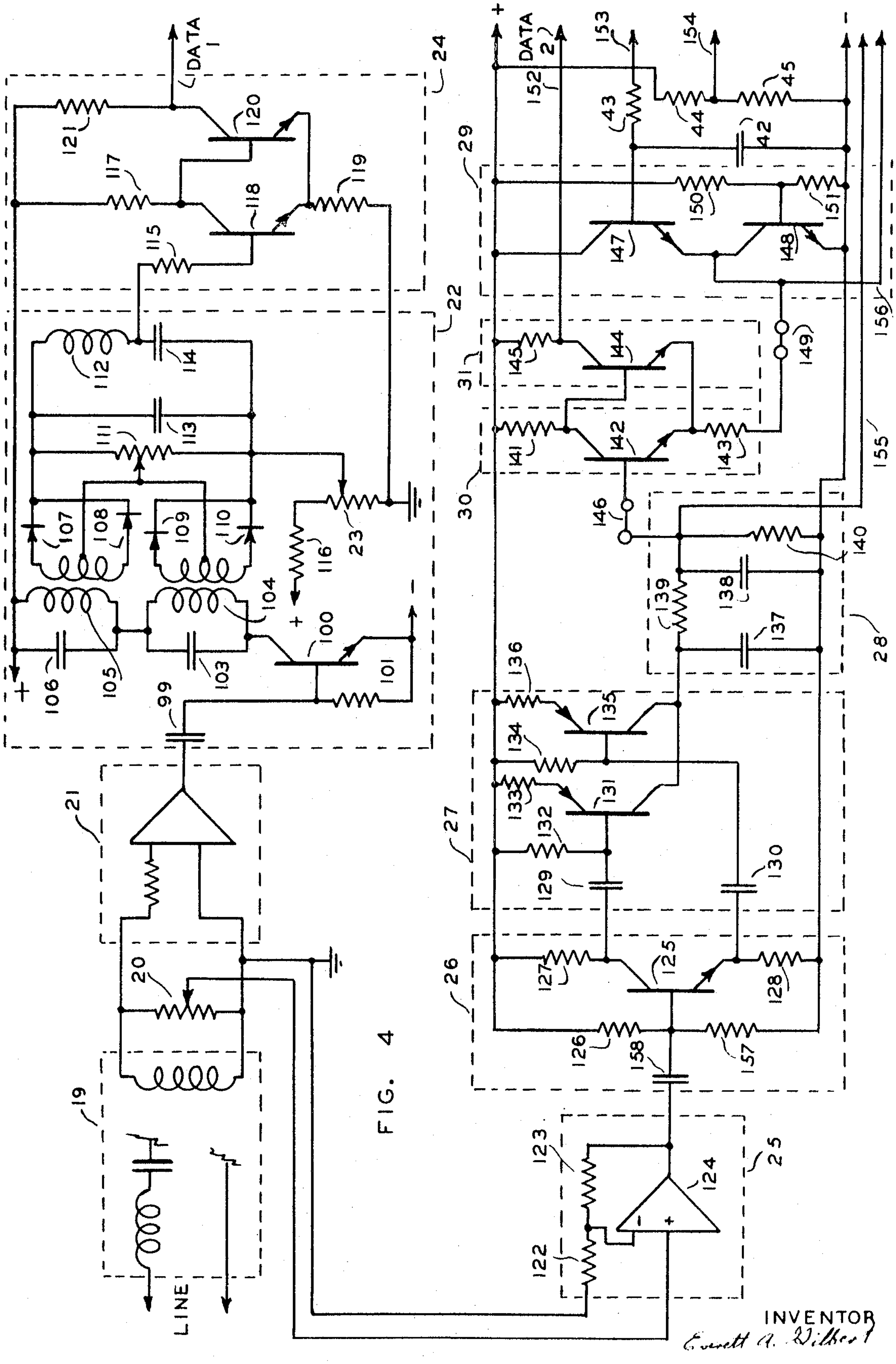
FIG. 4 is a schematic diagram showing one embodiment of the receiving section of my invention.

From the above description and with reference to the schematic diagrams of FIG. 3 and FIG. 4 showing in detail one embodiment of my invention, it again being understood that the arrangements shown do not restrict the scope of the invention beyond the claims appended at the end, a description of the operation of my invention follows.

Beginning with a negative going mark binary signal applied to terminal 50 with respect to terminal 51, the current flow into the base of transistor 55 is limited by resistor 52. If by accident terminal 50 goes positive, the diode 53 protects the transistor 55 from inverse voltages. Resistor 54 removes the charge from the base of transistor 55 when no signal is present on input terminals. The oscillator circuit in box 4 consisting of transistors 61 and 62 and resistors 56, 57, 58, 59, and 60 form a regenerative amplifier feeding the tuned inductance 3 that oscillates continuously when sources are applied. Voltage appears across winding 63, which is wound on the same core with tuned inductance 3. When transistor 55 is not clamped, a net negative voltage builds up on its collector due to rectification of the collector on inverse peaks of voltage. Only a small AC current flows in capacitor 2 and the oscillator frequency is at highest value. When the transistor 55 is conducting with current into its base, capacitor 2 is effectively shorted across winding 63 and lowers the oscillating frequency. The oscillator output is taken through a large value resistor 65. Since the output voltage is relatively high, the transistor 66 is driven full on and full off each carrier cycle. If voltage is present across the filter capacitor 69, current flows through resistor 67 and a chopped signal proportional to the voltage on the filter capacitor 69 appears across the potentiometer 68. This voltage consists of the fundamental and harmonic of the oscillator frequency, the sidebands due to the amplitude modulation and a component of the signal on the filter capacitor 69.

Returning to the data channel 2 input, the transistor 74 with resistors 71 and 73 and diode 72 perform a similar clamping function as transistor 55 and associated components. In this case the junction of the collector and resistor 9 is clamped to the positive source which for convenience is taken as + 12 volts. One terminal of resistor 8 is connected to the negative −12 volt source. The junction of resistor 8 and resistor 9 feeds the filter resistor 70. As resistor 8 and 9 are small in value compared to resistor 70, the voltage supplied to resistor 70 when transistor 74 is unclamped is approximately the negative source voltage. Resistor 9 is set smaller than resistor 8 and adjusted so that when transistor 74 is clamped on, the voltage at the junction of resistors 8 and 9 as measured from the +12 volt source is 10db. less than the unclamped voltage. This varies the levels at transistor 66 by 10db. and therefore modulates the output carrier with 10db. level changes. Resistor 70 and capacitor 69 form a low-pass filter to prevent sharp changes in the amplitude modulation, as fast changes in amplitude modulation result in frequency shift components that interfere with data channel 1.

A portion of the voltage across the potentiometer 68 is amplified by the components in box 11. Transistor 92 with biasing resistors 76 and 78 and emitter resistor 77 and collector resistor 79 form a phase splitter. The values of the coupling capacitors 75, 80, and 81 are set so that the low frequency signals of data channel 2 in the output of transistor 66 are filtered off. Transistors 93 and 94 with biasing resistors 82, 83, 84, 85, and 86 form a push-pull power amplifier. Resistor 85 is used to provide an accurate resistive match to the linear phase filter in box 12. This filter, consisting of shunt capacitor 88, shunt inductance coil 89, series capacitor 91, and series inductance 90, provides DC isolation from the circuitry and permits the signals to be placed on a line without loading other signals from similar filters in the output of other channels.

After transmission the amplitude-frequency shift modulate signals are connected to the receiver input shown on FIG. 4. The band-pass filter 19 passes the desired carrier frequency and the sideband components due to the amplitude and frequency modulation. For the data channel 1 the composite signal across potentiometer 20 is applied to a high-gain limiter amplifier 21 which clips the wave and gives a square wave output with no amplitude modulation, but retains the frequency shift modulation. This signal is coupled to the base of transistor 100 by capacitor 99. Resistor 101 is a base leak resistor. Transistor 100 is driven full on and off. Inductance 104 and capacitor 103 are tuned slightly above the highest or space frequency. Inductance 105 and capacitor 106 are tuned slightly below the lowest or mark frequency. Diodes 107 and 108 are full wave rectifiers for the mark inductance output winding and diodes 109 and 110 are full wave rectifiers for the space inductance output winding. When a mark signal is received, the voltage output of diodes 107 and 108 exceed the voltage output of diodes 109 and 110. When a space signal is received, the output of diodes 109 and 110 is greatest. Potentiometer 111 balances the positive output across capacitor C113 at mark frequency to equal the negative output at the space frequency. The discriminator output across potentiometer 111 is connected to a low-pass filter, consisting of inductance 112 and capacitors 113 and 114, to filter off the rectification products. The average DC potential at the output of the discriminator filter is set by the bias potentiometer 23 so as to adjust the telegraph bias of the data channel 1 output. Resistor 116 is connected to the +12 volt source and supplies DC bias current to potentiometer 23. When the output of the discriminator plus the DC bias from potentiometer 23 exceeds approximately 0.9 volts, current flows through resistor 115 into the base of transistor 118. Transistors 118 and 120 with collector resistors 117 and 121 and common emitter resistor 119 form a regenerative amplifier that instantly switches to one of two saturated states depending on the current through resistor 115. When current flows into the base of transistor 118, the circuit switches by means of the common emitter resistor so that the collector of transistor 118 is clamped to the emitter potential and cuts off transistor 120. When no current flows in resistor 115, the transistor 118 is open and transistor 120 is full on conducting. It can be seen then that the output of the data channel 1 of the receive section is a replica of the binary signal applied to the data channel 1 input terminals of the transmit side.

The envelope of the signal at the output of the channel filter 19 contains the information of data channel 2. Potentiometer 20 adjusts the level of the hybrid signal applied to the linear amplifier 25. The potentiometer also sets the output telegraph bias as will become apparent in the following description. The linear amplifier 25 consists of two feedback resistors 122 and 123 that set the gain of the microcircuit operational amplifier 124 to approximately 40 db. The output of the linear amplifier is coupled to transistor 125 with capacitor 158. Transistor 125 with biasing resistor 126 and 157 and collector resistor 127 and emitter resistor 128 form a phase splitter to generate two equal voltages of the opposite phase. One phase is coupled to the base of transistor 131 with coupling capacitor 129; the other phase is coupled to the base of transistor 135 by coupling capacitor 130. Resistors 132 and 134 are base leak resistors of transistors 131 and 135 respectively. Transistors 131 and 135 are used as class C rectifiers in which emitter resistors 133 and 136 control the current flow in the collector circuits. The collectors of transistors 131 and 135 are connected to the receive amplitude data filter which consists of capacitor 137, resistor 139 and capacitor 138. Resistor 140 carries the drain current for the average DC current. When the circuit is used as a data channel, switches 146 and 149 are closed. The DC amplifier in terminal 153 may be connected to a fixed reference voltage at terminal 154, that is, obtained by divider action from resistors 44 and 45, or to a pilot reference as described above and shown in FIG. 2. Resistor 43 and capacitor 42 form a low-pass filter that prevents data and carrier signals from being applied to the unity gain DC amplifier consisting of transistor 147, transistor 148, and biasing components consisting of resistors 150 and 151 to form a constant current source for the emitter of transistor 147. When the voltage at switch 146 exceeds the output of the unity gain DC amplifier 29 by about 0.9 volt at switch 149, the regenerative amplifier consisting of transistors 142 and 144 with collector resistors 141 and 145 with common emitter resistor 143 changes state. When the voltage at switch 146 goes positive and exceeds this switch over voltage, transistor 142 clamps the base of transistor 144 to the emitter and cuts transistor 144 off. When the voltage at switch 146 is less than the switch over voltage, transistor 142 is open and transistor 144 is conducting. Then a replica of the input to data channel 2 on the transmit side is present at the collector of transistor 144. It should be noted that when switches 146 and 149 are open and the output of the data filter 155 is connected to the DC amplifier input terminal 153, an output exists at terminal 156 that is proportional to the average signal level at the output of channel filter 19. This voltage is used as a pilot tone reference a shown in FIG. 2.

Having now described my invention in detail, various changes in the individual components and in the arrangement of the parts will become apparent to those skilled in the art. Changes of this character which fall within the scope and spirit of the invention are intended to be covered by the following claims.

I claim:

1. In a data transmission system, a transmitter for modulating two channels of nonsynchronous binary data into a single hybrid amplitude and frequency modulated carrier signal comprising:

a. A first channel with means for generating a frequency shift carrier with modulation products attenuated that are derived from frequency components in a first data signal that exceed the maximum dot cycle data rate,
b. A limiter circuit for the frequency shift carrier,
c. An amplitude modulator circuit with two sets of terminals,
d. Means for connecting the limited frequency shift carrier to one set of terminals of the amplitude modulator circuit,
e. For a second channel, means for clamping binary signals at a second set of terminals to one polarity,
f. A means for restricting the minimum and maximum potentials of this unidirectional signal,
g. A low-pass filter attenuating frequencies above the maximum dot cycle rate of the second binary signal,
h. Means for connecting the unidirectional, filtered and limited second binary signal to the second terminals of the amplitude modulator,
i. An output amplifier with input connected to the output of the amplitude modulator,
j. A band-pass filter with input connected to the output amplifier and output connected to a common transmission circuit, the bandwidth of this filter being at least twice the maximum dot cycle rate.

2. In an amplitude-frequency modulated data transmission system, a receiver for converting a hybrid amplitude and frequency modulated signal into two independent data channels comprising:

a. A band-pass filter with a set of output terminals for connecting to a common transmission circuit,
b. For demodulating the frequency shift components of the hybrid carrier signal, a limiting amplifier with input connected to the output terminals of the band-pass filter,
c. A frequency shift discriminator circuit with input connected to the output of the limiting amplifier,
d. A circuit for adjusting the telegraph bias of the output of the discriminator,
e. A regenerative amplifier with input connected to the biased output of the discriminator, the output of this amplifier being the first data channel and a replica of the data signal carried by the frequency shift carrier modulation products,
f. For demodulating the amplitude components of the hybrid signal, a variable attenuator connected to the output terminals of the band-pass filter,
g. A linear amplifier with input connected to the output of the variable attenuator,
h. A full wave rectifier circuit with input connected to the output of the linear amplifier,
i. A low-pass filter connected to the output of the full wave rectifier circuit,
j. For the purpose of regulating the telegraph bias of the second data channel, a two terminal voltage comparator circuit with one input connected to the output of the low-pass filter,
k. Means for generating a slowly varying voltage proportional to the average signal level of the hybrid carrier at the output of the common transmission circuit,
l. Means for connecting the above mentioned voltage to the second terminal of the voltage comparator,
m. A regenerative amplifier with input connected to the output of the voltage comparator circuit, the output of the amplifier being the second data output channel and a replica of the data signal carried by the hybrid carrier amplitude modulation products.

* * * * *